June 14, 1932. E. M. KRATZ 1,862,541
MACHINE FOR MAKING TRANSPARENT PAPERS
Filed May 14, 1930 3 Sheets-Sheet 1
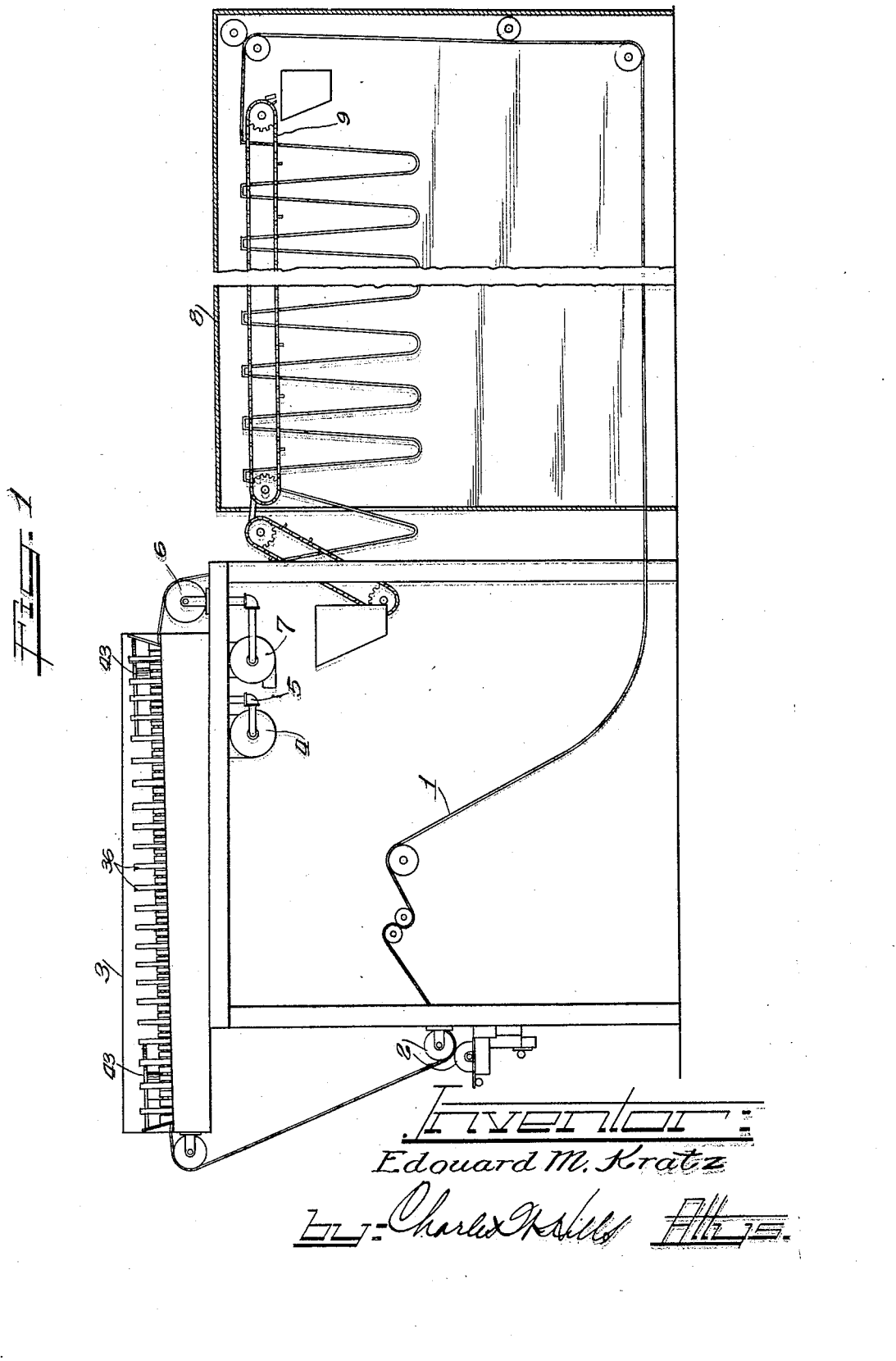

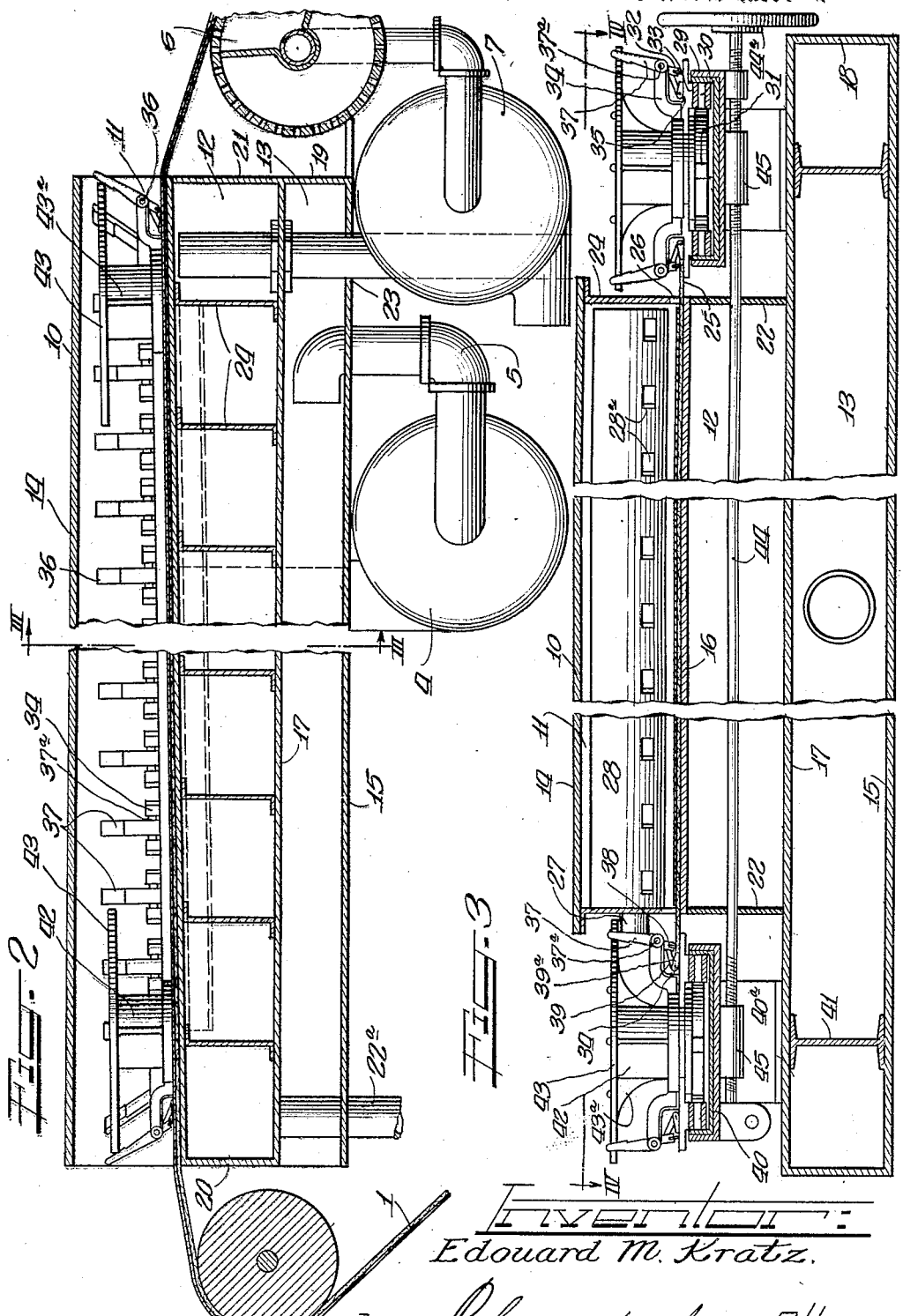

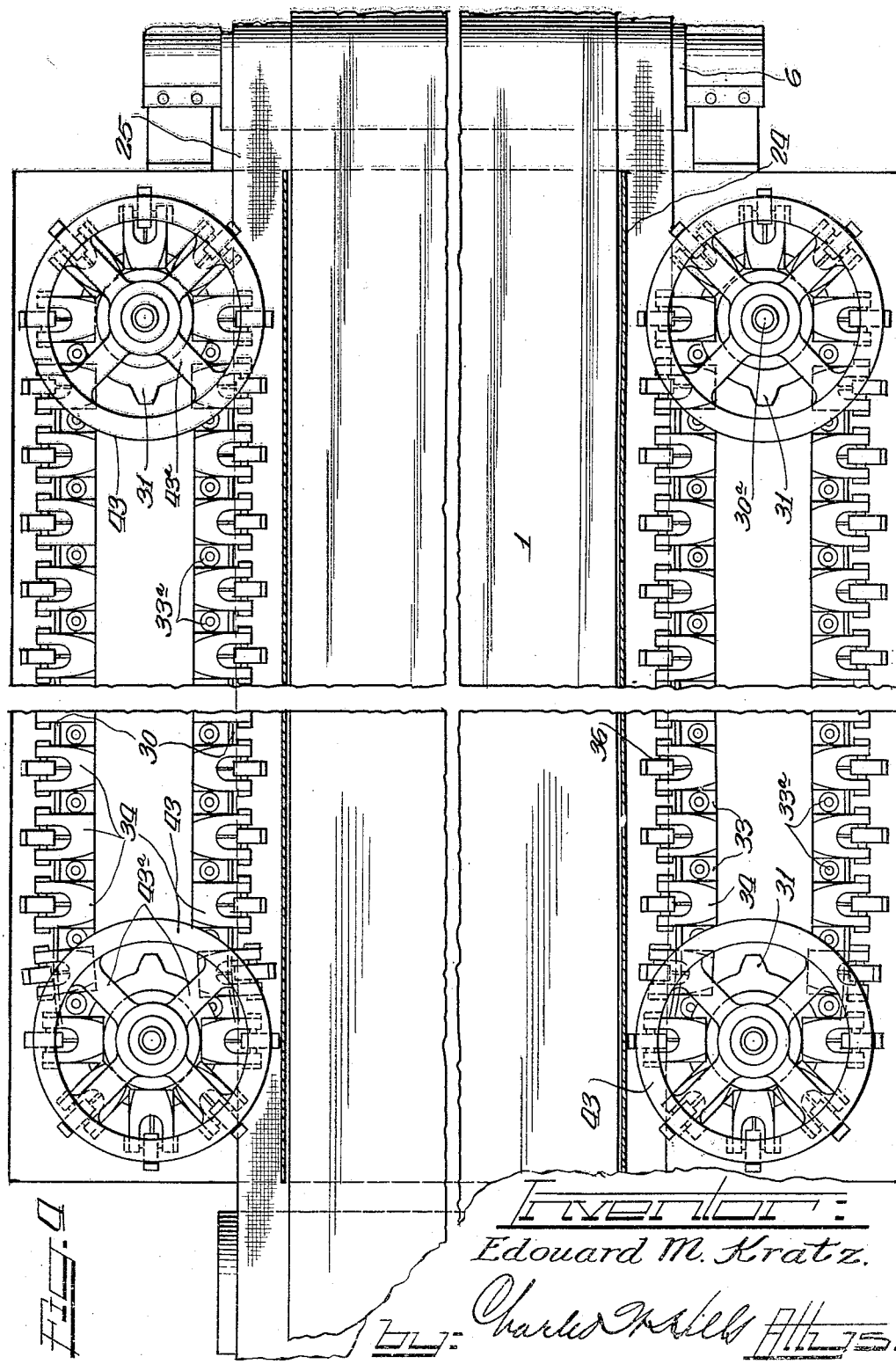

Patented June 14, 1932

1,862,541

UNITED STATES PATENT OFFICE

EDOUARD M. KRATZ, OF CHICAGO, ILLINOIS, ASSIGNOR, BY MESNE ASSIGNMENTS, TO MARSENE PRODUCTS CO., A CORPORATION OF ILLINOIS

MACHINE FOR MAKING TRANSPARENT PAPERS

Application filed May 14, 1930. Serial No. 452,161.

This invention relates to a machine for forming transparent sheet material in a continuous operation and more particularly to such a device provided with means whereby the carrier belt of the machine is prevented from wrinkling during the drying or congealing of the sheet material.

In my Patent No. 1,650,585, I have disclosed and claimed a machine for making in a continuous process transparent sheet material from gelatine or gelatine-sulphonated oil compositions. This machine and process are highly efficient in forming sheet material in relatively narrow widths in which the rate of drying of the gelatine film is not very rapid. However, when machines of this type are used in making relatively wide sheet material at higher speed, the drying of the gelatine film necessarily proceeds at such a rate that wrinkles are likely to occur in the carrier belt. After a few runs, these wrinkles grow in size and if allowed to remain in the belt, especially during the congealing or setting of the film, produce depressions, holes and other flaws in the sheet material, thereby decreasing the value of the same and to that extent impairing the efficiency of the machine.

I have now discovered that I can overcome this objectionable feature of the forming machine by providing means to subject the carrier belt to transverse tensioning or stretching action during the congealing of the gelatine film.

It is accordingly an object of this invention to provide a machine for forming transparent sheet material in a continuous operation wherein the carrier belt of the machine is maintained in a taut condition to remove wrinkles therefrom during the congealing or setting of the gelatine film.

A further object of this invention is to provide a machine for the forming of transparent sheet material in relatively large widths in a continuous operation and at relatively high speed with means to maintain the carrier belt of the machine in a smooth, unwrinkled condition during the congealing or setting of the gelatine or gelatine composition film.

Other and further important objects of this invention will become apparent from the following description and appended claims.

The forming machine of this invention with the exception of the jell box is similar to the machine disclosed and claimed in my Patent No. 1,650,585, so that the parts of the machine old in said patent will be but briefly described herein.

Referring now to the drawings which disclose a preferred form of my invention:

Figure 1 is a diagrammatic view of a forming machine with parts thereof in section;

Figure 2 is a broken, enlarged longitudinal sectional view through the chill or jell box showing the carrier belt passing therethrough.

Figure 3 is a broken sectional view taken on line III—III of Figure 2.

Figure 4 is a sectional view taken on line IV—IV of Figure 3.

As shown diagrammatically in Figure 1, the forming machine comprises a traveling fabric carrier belt 1, vertically and horizontally relatively adjustable coating rolls 2 for applying a gelatine or gelatine composition film to said carrier belt and a chill or jell box 3 for congealing or setting said film, together with means 4 and 5 for circulating a cooling medium therethrough.

The movement of the carrier belt through the machine is aided by a driven suction roll 6 evacuated by means of a fan 7. After leaving the chill box 3, the carrier belt is hung in festoons and the congealed gelatine film thereon dried in a festooning and drying chamber 8 in which the moving conveyors 9 are operative. The details of this general structure, excepting the chill box 3, are particularly described in my above mentioned patent so no further description thereof is herein necessitated.

The chill box 3 of this invention, see Figures 2 and 3, comprises a metallic box 10 in the form of an inverted T. This box is subdivided into three superposed horizontal compartments; air compartments 11 and 13 and a brine compartment 12, by means of a top wall 14, bottom wall 15 and the spaced horizontal partitions 16 and 17. The lower air compartment 13 which extends the full width of the chill box 4 is open at the front but closed at its sides and rear by side walls 18 and a rear wall 19.

The intermediate brine compartment 12 is completely inclosed between partitions 16 and 17, front and rear walls 20 and 21, and side walls 22. As will be noted, the side walls 22 of the compartment are spaced inwardly a distance from the side walls 18 of the lower air compartment for a purpose to be later explained. Brine enters compartment 12 at the front end thereof through the inlet 22a and overflows from the compartment through the outlet 23 at the rear of the compartment. A plurality of baffle plates 24 of the same height but of less width than said brine compartment are arranged in staggered relation therein in order to increase the length of flow of the brine from the inlet 22a to the outlet 23. The outlet 23 terminates adjacent the upper wall 16 of this compartment to provide for removal of air therefrom which if permitted to remain in the compartment would cause a decrease in efficiency of the heat transfer from the gelatine film to the brine.

The upper air compartment 11 is open at both its front and rear in order to permit the passage of the carrier web therethrough. The width of this compartment is restricted to the same width as the brine compartment 12 by means of side walls 24. As this effective width is less than the width of the carrier web 1, the side edges 25 of the belt project beyond the side walls 24 through openings 26 provided in said side walls for that purpose.

The floor or bottom of this compartment, which is formed by the partition 16, is that over which the carrier belt with its adhering gelatine film slides in its passage through the chill box. As will be noted this member 16 slopes upwardly from the front to the back end of the chill box so as to induce a slight backward and downward flow of the gelatine film to thus compensate for pores and other minute perforations in the carrier belt.

Air is circulated through compartments 11 and 13 by means of the blower 4 which has a connection 5 to the lower compartment 13 and another connection 27 to a slotted discharge pipe 28 in the compartment 11. The slots or perforations in the pipe 28 are provided with deflectors 28a so arranged that they direct the cold refrigerated air drawn from chamber 13 directly against the gelatine film on the carrier web 1 thereby increasing the refrigerating efficiency of the chill box.

The carrier web 1 as it passes through the drying chamber will have a tendency to wrinkle as the gelatine film dries thereon due to shrinkage of said film and if these wrinkles are permitted to remain in the belt especially during the congealing or setting of the film, depressions, holes and like flaws will be produced in the film. Therefore I provide means, indicated generally by the reference numeral 29, along both sides of the chill box to grasp the projecting edges 25 of the carrier web to maintain it in a stretched or taut condition and thereby draw the wrinkles out of the belt so that as the film sets or congeals in the chill box a smooth set film will result. Said means 29 is in the form of a tentering device which automatically grips the edges of the carrier web as it enters the chill box, draws it through said box and automatically releases it at the rear end of said box.

Specifically said tentering device comprises a pair of independent endless members 30 each of which passes around sprockets 31 rotatably mounted adjacent the front and rear ends of the chill box and at opposite sides of the same. Each of said endless members 30 are driven from the same prime mover (not shown) so that their speed can be properly co-ordinated. Said endless members 30 are made up of a plurality of clamps 32 each of which comprises a base 33 formed to simulate a chain link and an upper jaw portion 34. The bases 33 of the clamps are pivoted together as at 33a whereby in effect an endless chain having integral jaws thereon is produced.

The jaw 34 of a clamp has a lower plane face 35 on which the edge of the belt 1 is received. The belt edge is retained on this face and within the jaw by means of a nipper 36 comprising an arm 37 pivoted intermediate its ends as at 37a to the upper end of the jaw so that the lower end 38 of said arm lies across the mouth of the jaw. The bottom face of said arm has a rounded edge adapted to firmly bind the edge of the belt against the under face of the jaw when the lower end 38 of the arm swings outwardly a slight distance. The lower end of the arm is weighted so as to cause the arm to normally swing to a position to grip the edge of the belt when the same is positioned in the jaw.

As will be appreciated, with this structure an excessive transverse tension on the belt might cause the nipper to bite into the edge of the belt to such an extent as to cut the same. This action is prevented by providing the lower end of arm 38 with an internal lug 39 to which is pivoted a shoe or follower 39a adapted to bear against the lower face of the jaw. The outward swinging movement of the lower end of arm 37 thus causes the lug 39 to force the shoe 39a against the lower face of the jaw, preventing further movement of said arm.

The endless members 30 are guided in their movement along the sides of the chill box by laterally adjustable trackways 40 supported on blocks 40a. Such blocks 40a are in turn supported upon the laterally extended sides of the partition 17 at or near the ends thereof. To prevent buckling of said partition, I-beams 41 are located in compartment 13 to support said partition.

The operation of said tentering device 29 is made automatic by means of drums 42 having enlarged discs 43 supported by webs 43a, at the upper ends thereof. One of such drums is provided at the head and rear end of each endless member 30. Said drums 42 are mounted on the same shafts 30a that carry the sprockets 31 so that the discs 43 overlie said endless members as said members move around the sprockets 31. Each disc 43 is positioned at such a height above an endless member that its periphery is in position to contact the upper end of a nipper 36 as the same moves around a sprocket 31. In this way, as the nippers on the endless members move forward from the sprockets 31 at the entrance of the chill box the nippers are swung by contact with the discs 43 to permit the reception of the edges of the carrier belt within the jaws of the clamps. As the nippers move free of discs 43, they swing by gravity to bind the edges of the belt in the clamps. The belt is thus put under a transverse tension and held taut as it moves through the chill box. At the exit end of the chill box, the nippers contact other discs 43 and are thereby moved to release the carrier belt.

Preferably the trackways 29 are made to diverge slightly adjacent the entrance end of the chill box to create a tendency for the nippers to stretch the carrier belt 1 transversely and thus insure a proper binding of the edges of the belt within said nippers. Said trackways are also given the same inclination as partition 16 so that the endless members 30 will move parallel to said partition.

The trackways are, as stated, laterally movable and can be adjusted to the desired position by means of a threaded rod 44 which extends through the brine chamber to sockets 45 fastened to the bottom of the trackways and in which the ends of said rod are threaded. One end of the rod is extended a short distance beyond the side of the chill box to provide a part 44a for manipulating said rod.

The operation of this forming machine is the same as that disclosed in my above mentioned patent with the exception that the traveling carrier web is maintained in a taut position by the tentering device 29 as it moves through the chill box. The circulation of brine through the chill box compartment 12 and the circulation of air through the air compartments 10 and 13 causes a rapid jell of the gelatine film as the tentering frame 29 draws the wrinkles out of the belt, this action produces a smooth, moist film of high quality. After passing through the chill box the carrier belt 1 is drawn over the suction roll 6 and passes through the drying and festooning chamber 9 after which the dried gelatine sheet may be stripped mechanically from belt 1.

It can thus be appreciated that I have devised a device which will effectively draw the wrinkles caused by the rapid drying of the gelatine film out of the belt during its passage through the chill box, thereby providing for the formation of transparent sheet material in larger widths of a high grade in a continuous operation. Needless to say the efficiency of the machine is thereby greatly increased by employing the tentering device disclosed.

It will be noted that the tentering device 29 draws the carrier belt 1 through the machine and hence, if desired, the suction roll 6 may be omitted. The suction roll, however, aids in preventing the central portion of the carrier belt from lagging behind the sides thereof.

It is of course to be understood that certain changes may be made in the construction of my device, and accordingly I do not intend to be limited in the patent granted except as necessitated by this prior art.

I claim as follows:

1. A machine for forming transparent sheet material in a continuous operation, comprising a moving endless carrier belt, means for applying a plastic film to said belt, means for quickly congealing said film, means associated with said last named means for producing a lateral stress on said belt thereby drawing wrinkles from said belt during the congealing of said film and means for drying said film.

2. A machine for forming transparent sheet material free from wrinkles, holes and the like in a continuous operation comprising an endless carrier belt, means for applying a thin plastic film to said belt, a chill box for quickly congealing said film, tensioning means associated with said chill box for gripping the side edges of said belt to place the same under a transverse tension as said belt moves through said chill box and means for drying said belt and film thereon.

3. In a machine for forming transparent sheet material, an endless belt for carrying a gelatine film, a chill box through which said belt passes for congealing said film and means extending along both sides of said box for maintaining said belt taut during its passage through said chill box.

4. In a machine for forming transparent sheet material, an endless belt for carrying a gelatine film, a chill box for congealing said film by passage of said belt therethrough, and continuously moving gripping means along the sides of said box for maintaining said belt taut as it passes through the box and for drawing it therethrough.

5. In a machine for forming transparent sheet material, comprising an endless belt for carrying a gelatine film, a chill box for congealing said film having a compartment through which the belt passes and of such width that the side edges of the belt project therefrom and means at the sides of said compartment for gripping the projecting edges of said belt to maintain the same taut as it moves through said compartment.

6. In a machine for forming transparent sheet material, an endless belt for carrying a gelatine film, a chill box for congealing said film having a refrigerating compartment through which said web passes and of such width that the side edges of said belt project therefrom and endless moving members along the sides of said compartment having means for gripping the projecting edges of said web to draw it through said compartment and maintain it taut in its passage therethrough.

7. In a machine for forming transparent sheet material, an endless belt for carrying a gelatine film, a chill box for congealing said film having a compartment through which said belt passes and of such width that the side edges of said belt project therefrom, endless traveling members along each side of said compartment having gripping jaws for automatically receiving the projecting edges of said belt as it enters said compartment to draw the same through said compartment and maintain it taut in its passage therethrough.

8. In a machine for forming transparent sheet material, an endless belt for carrying a gelatine film, a chill box through which said belt passes for congealing said film, and of such width that the side edges of said belt project therefrom, endless moving members along the sides of said chill box, gripping jaws on said endless members for gripping the projecting edges of said belt to maintain it taut as it moves through said box, means adjacent the entrance end of said chill box for placing said jaws in position to receive the edges of said belt and means at the exit end of said chill box for releasing said jaws from said belt.

9. In a machine for forming transparent sheet material, an endless belt for carrying a gelatine film, a chill box for congealing said film having a refrigerating compartment through which said web passes of such width that the side edges of said belt project therefrom, endless moving members along the sides of said chill box, gripping jaws on said endless members for gripping the projecting edges of said belt to maintain it taut as it moves through said box, means adjacent the entrance end of said chill box for placing said jaws in position to receive the edges of said belt and means at the exit end of said chill box for releasing said jaws from said belt.

10. In a machine for forming transparent sheet material, an endless belt for carrying a gelatine film, a chill box for congealing said film having an open ended compartment through which said belt passes and of such width that the side edges of said belt project therefrom, a bottom for said compartment over which said belt slides, and having a slight upward inclination from the entrance to the exit end to cause a backward flow of the gelatine film, and means along the sides of said compartment for grasping the projecting edges of said belt to draw it through said compartment and maintain it taut in its passage therethrough.

11. In a machine for forming transparent sheet material, an endless belt for carrying a gelatine film, a chill box for congealing said film having an open ended compartment through which said belt passes and of less width than said belt, a sloping floor for said compartment over which said belt slides, side walls for said compartment having openings to permit the side edges of said belt to project therethrough and endless members along the sides of said compartment having jaws for automatically gripping said projecting belt edges as the belt enters the chill box and for maintaining said belt taut in its passage therethrough.

12. In a machine for forming transparent sheet material, an endless belt for carrying a gelatine film, a chill box having an air compartment through which said belt and film pass, but of such width that the side edges of said belt project therefrom, a brine chamber beneath said air compartment, a second air compartment beneath said brine chamber and connected to said first air compartment, means for circulating air through said air compartments and brine through said brine chamber to effect a congealing of said film as the belt moves through said upper air compartment and traveling gripping means along said chill box for grasping the projecting edges of said belt to draw it through said box and maintain it taut in its passage therethrough.

13. In a machine for forming transparent sheet material, a traveling belt for carrying a gelatine film, a chill box having an open ended air compartment of less width than said belt through which said belt and film pass, a sloping bottom for said compartment over which said belt slides, side walls for said compartment having openings through which the side edges of said belt project, a brine compartment beneath said air compartment, a second air compartment beneath said brine compartment and interconnected with said first air compartment, means for circulating air through said air compartments and brine through said brine compartment to congeal said film and means for gripping the side edges of said belt for drawing said belt through said chill box and maintaining it taut in its passage therethrough.

14. In a machine for forming transparent sheet material, an endless belt for carrying a gelatine film, a chill box for congealing said film through which said belt and film pass and of such width that the side edges of said belt project therefrom, independent endless members along the sides of said chill box, jaws on said members for receiving the projecting side edges of said belt therebetween, means associated with said jaws for gripping said edges and retaining said edges in said jaws to hold said belt under transverse tension and thereby remove the wrinkles therefrom and means for moving said endless members to draw said belt while under tension through said chill box.

15. In a machine for forming a transparent sheet material, an endless belt for carrying a gelatine film, a chill box for congealing said film through which said belt and film pass and of such width that the side edges of said belt project therefrom, an endless movable member at each side of said chill box, gripping jaws on one endless member opposed to gripping jaws on the other member for receiving the edges of said belt therebetween, a trackway for each endless member diverging from each other at points adjacent the entrance end of the chill box so that the jaws on each member move laterally from the jaws of the other member thereby placing the web under tension and means on each jaw to bind the edges of the belt therein against the tensional pull tending to draw the belt therefrom.

16. A machine as in claim 15 wherein the trackways are laterally adjustable and means are provided for moving said trackways to properly adjust the same.

17. A device as in claim 15 wherein means are provided at the entrance to the chill box to cause said jaws to automatically grip the edges of said belt and at the exit end of said chill box to automatically cause said jaws to release said belt.

18. A chill box for congealing a gelatine film on an endless belt of a transparent paper machine comprising an inverted T-shaped receptacle, horizontal partitions in said receptacle dividing the same into an upper compartment for air, an intermediate compartment for brine, and a lower compartment for air, the upper of said partitions forming the floor for said upper compartment over which said belt slides, said floor being inclined from the entrance to the exit end to cause the gelatine film on said belt to flow backwardly to thereby compensate for pores and the like in said belt, means interconnecting said air compartments, means for circulating air through said air compartments and brine in said brine compartment and baffles in said brine compartment to increase the lengths of flow of said brine therethrough, and means for subjecting said belt to a lateral stress while passing through said inverted T-shaped receptacle, thereby preventing the formation of wrinkles in said belt.

19. A continuous process for forming transparent sheet material free from holes, wrinkles and the like, which comprises applying a film of gelatine to a traveling belt, cooling said film while said belt is held in an inclined position and subjected to a lateral stress, to congeal the film without forming wrinkles, holes and other flaws therein and drying said film.

In testimony whereof I have hereunto subscribed my name at Chicago, Cook County, Illinois.

EDOUARD M. KRATZ.